May 17, 1927.　　　　　　W. J. MILLER　　　　　　1,629,455
GLASS FABRICATING APPARATUS
Original Filed Sept. 10, 1923　　3 Sheets-Sheet 1

INVENTOR
William J. Miller,
by Edward A. Lawrence.
his Attorney

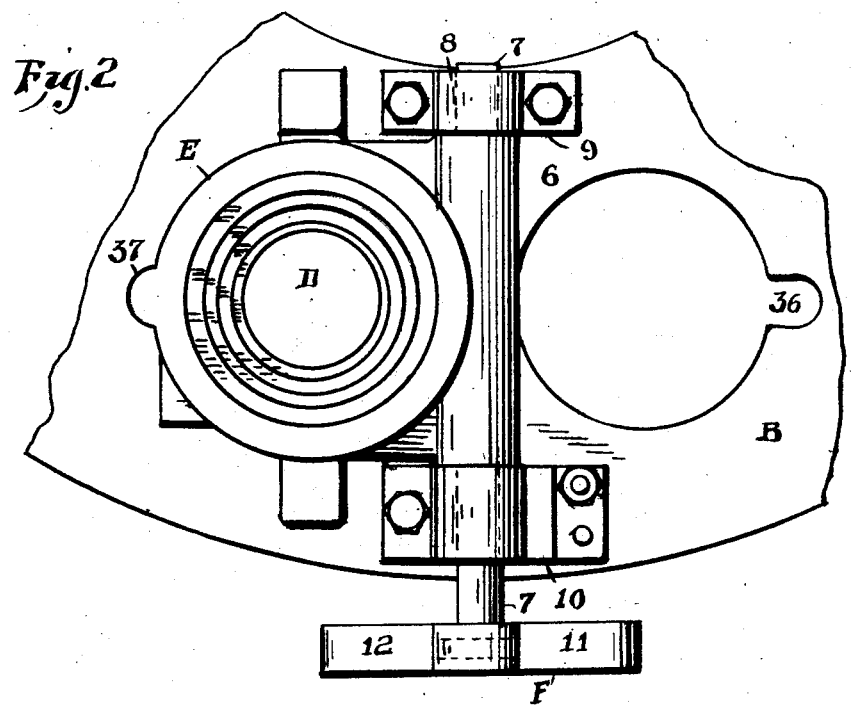
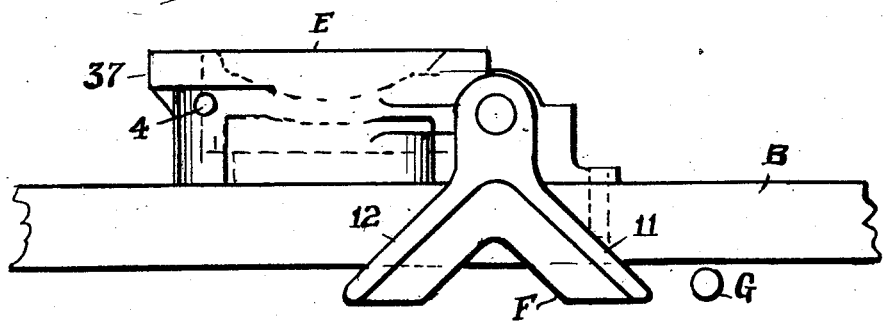

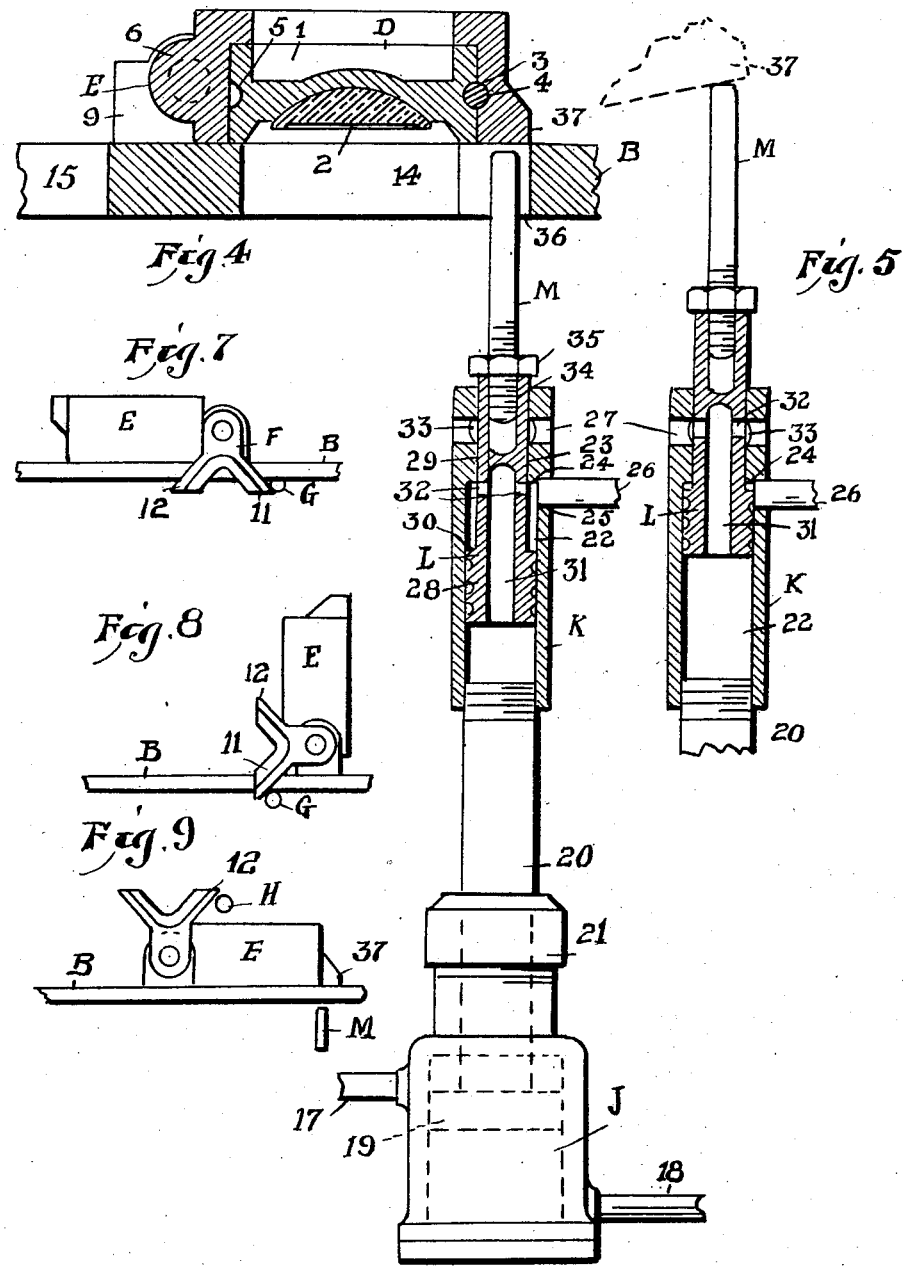

Patented May 17, 1927.

1,629,455

UNITED STATES PATENT OFFICE.

WILLIAM J. MILLER, OF SWISSVALE BOROUGH, PENNSYLVANIA, ASSIGNOR, BY MESNE ASSIGNMENTS, TO WILLIAM J. MILLER, INC., OF SWISSVALE, PENNSYLVANIA, A CORPORATION OF DELAWARE.

GLASS-FABRICATING APPARATUS.

Application filed September 10, 1923, Serial No. 661,812. Renewed December 3, 1926.

My invention consists in certain new and useful improvements in machines for fabricating articles of glass.

While my present invention may be used to advantage in the manufacture of many kinds of glassware, it more particularly relates to apparatus for pressing or otherwise fabricating high grade flat or shallow articles, such as optical and condenser lens blanks, in which manufactures the molds must be maintained at an extraordinary high temperature to produce perfectly clear glass and to avoid bulls-eyes and other defects.

The molds in use for forming articles of such general character are usually solid or non-partible, and are heated to an unusually high degree, and the ware tends to stick thereto, and can not, therefore, be readily discharged from the mold in the ordinary manner, after the fabrication is completed.

The highly heated condition of the molds tends to cause the glass to stick thereto, and therefore the object which I have in view is the provision of efficient means for discharging the fabricated articles from the molds.

For this purpose I have invented the following improvements.

I have provided new and improved means for inverting the mold, after the fabrication of the article therein, so that the latter will tend to drop down out of the mold; and for then returning the mold to its upright position ready to receive another gather or gob of molten glass preparatory to the next fabricating operation.

I have also provided new and improved tapping means for jarring the inverted mold as an additional means for loosening the fabricated article which may stick to the mold, thus insuring its discharge from the inverted mold.

Other novel features of construction, and also of arrangement of parts, will appear from the following description.

Figure 1:
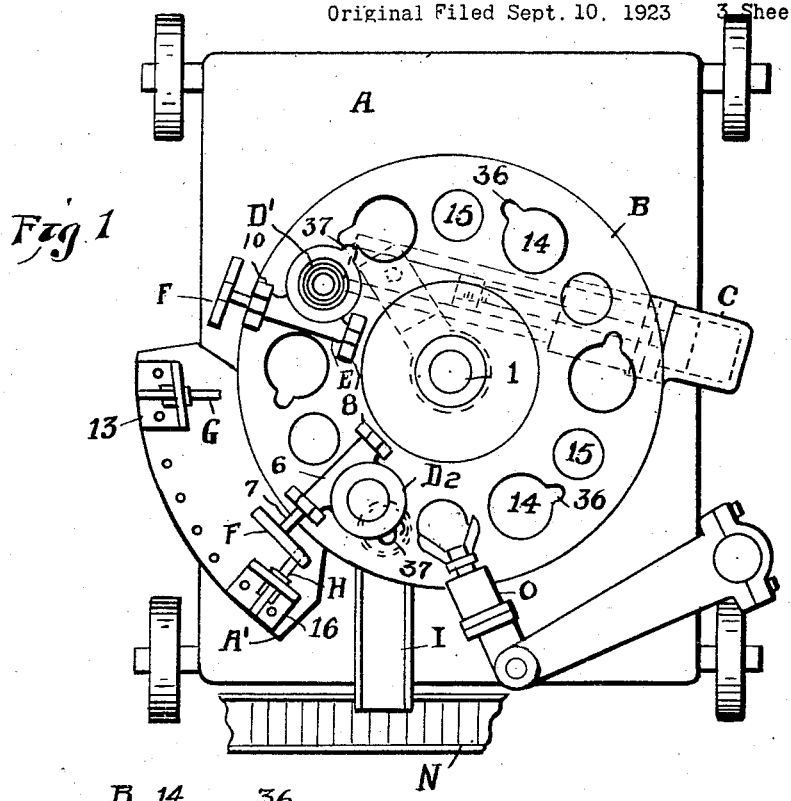
Figure 6:
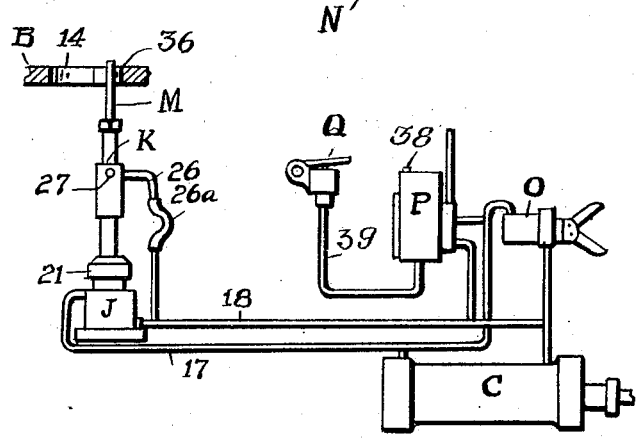

In the accompanying drawings, which are however merely intended to illustrate a practical embodiment of the principles of my invention without limiting the scope thereof to the construction shown, Fig. 1 is a partial plan view of a rotary mold-table pressing machine to which my invention has been applied, all but two of the six molds being omitted for the sake of clearness; Fig. 2 is an enlarged detail in plan of a portion of the mold table showing the mounting of one of the invertible molds; Fig. 3 is a side elevation of the same; Fig. 4 is an enlarged side elevation partially in section, showing the tapper used to dislodge the fabricated glass article from the inverted mold, the tapping pin being shown at the bottom of its stroke; Fig. 5 is a similar but incomplete view showing the tapping pin at the top of its stroke; Fig. 6 is a diagrammatic view showing the piping assemblage which may be used to operate the tapper by fluid pressure, and Figs. 7, 8 and 9 are detail views showing the method of inverting the molds and of returning them to their upright position.

The following is a detailed description of the drawings.

A represents the base of the fabricating machine, shown as a wheeled truck, and B is the movable mold support which is shown as a rotary table moving about the central axis or standard 1. The movement of the mold support may be constant or intermittent, but in the illustrated embodiment the table is assumed to be rotated in an intermittent or step by step manner and in a counterclockwise direction by means of the fluid pressure cylinder C. I do not show in detail the construction of the table rotating mechanism, but for the purpose of illustration I have indicated the type of table rotating mechanism shown and described in Letters Patent of the United States No. 1,329,624, issued to me on February 3rd, 1920.

The mold support or table B carries a plurality of molds, shown arranged in annular series concentric with the table. The table as shown, is arranged to accommodate six molds, generally indicated by the reference letter D, but only two molds, D' and D² are shown, the remainder being omitted to more clearly disclose the structure of the table.

The molds shown in the drawings are for the pressing of optical lens blanks, indicated at 2 in Fig. 4.

The molds are mounted on the table in such a manner that, after the molten glass has been pressed or otherwise fabricated in a mold, and before a fresh charge of glass is deposited in the mold, the mold is inverted to discharge the fabricated article, and then, after the article is discharged from the mold, the now empty mold is reversed into its upright position before it again reaches the feeding station.

The molds may, of course, be themselves hinged to the mold table, but, to facilitate the change of the machine from one type of product to another, I prefer to removably mount the molds in suitable carriers which are in turn reversibly mounted on the table.

Thus I have shown carriers E provided for the molds, said carriers having suitable seats in which the molds are inserted, and in which seats the molds are locked in any convenient manner. Thus, as indicated in the drawings, the seat which is shown as circular to receive a circular mold, is intersected tangentially by the key-socket 3 into which is inserted the key 4 which also engages the groove 5 extending circumferentially of the mold D.

The carrier E may be attached to the table in any suitable manner which will permit it to be moved to reverse the mold and then return the latter to its upright position.

Thus, I have shown the carrier provided with an integral sleeve 6 which is horizontally disposed perpendicular to a radius of the mold seat. 7 is a pivot shaft having a drive fit in and keyed to said sleeve, with its ends protruding and journaled in the bearings 8 of a pair of bearing blocks 9 and 10 which are mounted on the table in a line radial of the axis of the latter. The sleeve 6 fits between the bearing blocks with sufficient snugness to cause the carrier to be swung in the proper arc of movement, but without binding.

The outer end of shaft 7 protrudes beyond the edge of the table and has rigidly keyed thereon a throwing lever F provided with two engaging surfaces or edges 11 and 12 disposed at angular relation to each other. The lever F is so assembled with the shaft 7 that when the mold is in its upright position, ready to receive the molten glass and for the fabrication of the latter, the lever depends below the table, as shown in Figs. 3 and 7, with its edge 11 in advance in the direction of table movement, but when the mold is reversed, as shown in Fig. 9, the lever extends upwardly with its engaging edge 12 in advance.

13 is a bracket mounted adjacent to the table and positioned beyond, in the direction of table movement of the fabricating position which has been passed by the mold D' in Fig. 1. G is a striking pin mounted on said bracket and extending inwardly toward the table B into the path of the depending lever F, so that as the mold D', during the next movement of the table, passes the bracket 13, the edge 11 of said lever will be engaged by the pin G, and will swing said lever clockwise, as indicated in Figs. 7 and 8, thus reversing the carrier and its mold past the vertical, so that the carrier mold will then fall down into the position shown in Fig. 9.

The mold table B is provided with a series of apertures 14, equal in number to the molds and each aperture so placed that when the corresponding mold is inverted, it will register with said aperture. Thus the apertures 14 provide clearance through the table through which the article drops from the reversed molds, but the table supports the molds in their inverted positions.

The table is also preferably provided with a like number of smaller openings or apertures 15 with which the molds register when in their upright position, so that when there is no mold mounted in the carrier or where for some reason a mold remains inverted when it again reaches the feeding position, the gathers or gobs of glass supplied at the feeding position will drop down through the aperture 15 into the cullet pit.

16 is a second bracket which is mounted in advance of the bracket 13 in the direction of the table's movement. The bracket 16 is provided with a horizontally disposed upsetting pin H positioned at a higher level than the pin G so that during the next movement of the table said pin H is engaged by the edge 12 of the lever F, with the result that, as the table continues to move said lever F is swung in a reverse direction, thereby moving the carrier E from its position shown in Fig. 9, through its vertical position shown in Fig. 8 back into its position shown in Fig. 7 wherein the mold is again positioned ready to receive a fresh charge of glass.

It is thus evident that, as the table moves, the molds in turn are supplied with molten glass; the glass is next fabricated in the mold, forming the article; the mold is then reversed or upset to discharge the article downwardly through the aperture 14 into a discharge chute I or other suitable receiver under the mold table. The mold is then returned to its upright position. The mold, as it falls down into its reversed or inverted position, strikes the table with a jar which tears loose and forcibly ejects the article.

The brackets 13 and 16 may be bolted on a support A' carried by the base A, said support being provided with a plurality of properly spaced bolt holes to permit the proper adjustment of bracket position.

However, as an auxiliary means to positively prevent the article sticking to the inverted mold and to insure its discharge, I provide tapping mechanism which hammers or taps the inverted mold when the latter is in its dumping position.

A highly satisfactory and efficient tapping mechanism is illustrated in the drawings as of the following construction.

J is a vertically disposed fluid pressure cylinder mounted on the base of the machine and provided with fluid pressure pipes 17 and 18 which connect to the top and bottom of said cylinder respectively. 19 is a piston working in said cylinder and whose piston rod 20 protrudes upwardly through the gland 21 in the upper end of the cylinder J. The upper end of the piston rod 20 is threaded and screwed into the lower end of a small cylinder K which is thus mounted on and moves with the piston rod.

The bore of the cylinder K is differentiated, the larger bore 22 being below and the smaller bore 23 above with the internal shoulder 24 interposed between the same. 25 is a port in the cylinder wall for the admission of fluid pressure into the upper end of the larger bore 22, said port being connected by the branch pipe 26 with the pipe 18 which admits pressure to the lower end of the cylinder J. A portion of the pipe 26 should be flexible, such as a piece of rubber hose, as shown at 26$^a$, so as not to interfere with the raising and lowering of the cylinder K. Near the upper end of the cylinder K, its smaller bore 23 is intersected by the radial ports 27 leading to atmosphere.

L is the differential piston working in the cylinder K, its larger diameter 28 fitting the larger bore of the cylinder snugly and being provided with circumferential oil grooves which act as packing. The smaller diameter 29 of the piston L fits the smaller bore 23 of the cylinder K. 30 is the internal shoulder on the piston interposed between the two diameters.

The piston L is axially bored from its lower end to form the chamber 31 whose upper end is intersected by the radial ports 32 in the piston equal in number to the radial ports 27 of the cylinder. Said ports 32 are so positioned that when the piston is depressed, as shown in Fig. 4, they are below the shoulder 24 and thus are in communication with the larger bore 22 of the cylinder K, and when the piston is in its elevated position, shown in Fig. 5, the ports 32 register with the ports 27. As the piston L might be accidentally turned to prevent such registration, I prefer to provide the interior of the bore 23 of the cylinder K with an annular groove 33 intersecting the ends of the ports 27, thereby insuring free communication between the outer ends of the ports 32 and the atmosphere when the piston L is raised.

The upper end of piston L is provided with a threaded axial opening 34 into which is adjustably screwed the tapping pin M, a nut 35 being provided to lock the rod in its adjusted position in the end of the piston. Thus the rod may be raised or lowered relative to the piston, so that a proper tap may be obtained.

The apertures 14 in the table B are provided with notches 36 at their front edge with which notches register the lips 37 extending from the carriers E.

When a mold comes to rest in its discharging position, after it has been upset by the striking pin G, the notch 36 in the table and the lip 37 of the carrier are vertically alined with the upper end of the hammer pin M.

Thereupon fluid pressure is admitted to the pipe 18, elevating the cylinder K, and the piston L therewith. Assuming the piston L to be in the position relative to its cylinder K which is shown in Fig. 4, the fluid pressure admitted from the pipe 18 through the branch pipe 26 will enter the ports 32 and the bore 31 of the piston L and fill the bottom of the cylinder K. The area of the bottom of the piston L is greater than that of the shoulder 30, and therefore the pressure from below is greater than that from above, and the piston will be driven upwardly in its cylinder, causing the upper end of the pin M to tap on the lip 37, thus jarring the inverted mold. As soon as the ports 32 rise into registration with the groove 33 and the ports 27, the fluid pressure in the lower end of the cylinder K will be relieved to atmosphere and the thus unbalanced pressure continuously exerted on the shoulder 30, will cause the piston to descend into its first described position, thus lowering the striking pin M out of contact with the carrier. As soon as the piston L is lowered sufficiently to bring the ports 32 into communication with the larger bore 22 of the cylinder K, pressure will again be admitted to the lower end of the cylinder K, once more overbalancing the downwardly pressure on the shoulder 30, and thus starting the piston upwardly and causing it to strike another tap on the carrier E.

The tapping of the carrier E is continued, until the fluid pressure is relieved from the pipe 18, and admitted to the pipe 17 to lower the piston 19 in the cylinder J, thus lowering the jarring mechanism into its inoperative position which it retains until another mold is inverted and moved into the discharge position.

Suitable means for receiving and carrying away the discharged ware may be provided. Thus in Fig. 1 I show an inclined chute I which receives the glass article dumped by the molds down through the apertures 14, from which chute the articles may be transferred to a carrying paddle to be conveyed to the lehr, or I may provide a traveling conveyor N, Fig. 1, to which the chute I delivers the articles, and which may automatically convey the articles to the lehr or other destination.

My method of inverting the mold is unique, inter alia, because the mold is turned over for substantially ninety-five degrees while the mold table is in motion, completing its inversion by gravity and momentum as the table halts. Thus the mold falls rapidly from an almost vertical position into its inverted horizontal position where its fall is halted by sharp contact with the table. This jolts the article in the direction of its discharge, imparting the ejecting impulse downwardly or in the proper direction.

To properly time the operation of the mold jarring mechanism, I actuate the same in synchronization with the operation of the table rotator and the shears.

In my said Letters Patent No. 1,329,624, I have fully shown and described mechanism for intermittently rotating the mold table, for locking the table stationary while at rest, and for shearing the necks of the gathers or gobs of glass, said mechanisms being operated and controlled in proper synchronization, the table locking mechanism being released by the attendant as he places a gather of molten glass into the mold waiting in the feeding position, and the release of the table locking mechanism admitting fluid pressure to the table rotator cylinder to cause the rotation of the table, and also the shear cylinder to close the shears and thereby sever the gather and allow the latter to drop into the mold. The locking mechanism is automatically held in its retracted position while the table is being rotated, but, at the completion of a table movement, is automatically released and moves into engagement with the table to lock the same stationary. This upward extension or operative movement of the table locking mechanism automatically admits fluid pressure to the table rotator cylinder to retract the rotator mechanism and also admits pressure to the shear cylinder to open the shears so that the attendant may deposit a gather of glass in the mold which has just reached the feeding position.

I do not describe these mechanisms in detail for their structure and operation is fully disclosed in my said Letters Patent.

However, to briefly explain the synchronization of the operation of the mold tapping mechanism with the table rotating mechanism, I have shown in Fig. 6 the inner end of the rotator cylinder C and the inner end of the shear cylinder O connected with the pipe 17 which supplies fluid pressure to the upper end of the cylinder J of the tapper, thereby lowering the mold tapping apparatus into its inoperative position as the table begins a movement and the shears close to sever the depending gather of glass.

Also the front ends of the cylinders C and O are connected to the same pipe 18 which supplies fluid pressure to the lower end of the cylinder J, to elevate the jarring mechanism into its operative position and to cause the tapping pin M to reciprocate and thus jar the mold. Thus when the table comes to rest and the shears open, the mold jarring mechanism is elevated and actuated, as above described.

As will be understood by reference to my said Letters Patent, fluid pressure is automatically admitted to the front end of a rotator cylinder, indicated at C, to retract the rotator in its idle stroke, and to the front end of the shear cylinder O to open the shears when the locking piston 38 of the table locking mechanism, indicated at P, is elevated to engage the table. Likewise when said locking piston 38 is depressed to release the table, the locking mechanism P acts to admit fluid pressure to the rear ends of the cylinders C and O, to start the movement of the table and to close the shears. Thus the pipes 17 and 18 in Fig. 6 are also connected to the locking mechanism in the same respective manners as the corresponding pipes 80 and 81 are connected up to the locking mechanism in Fig. 4 of the drawings of my said Letters Patent.

The release of the locking mechanism is shown accomplished by means of the bleeder valve Q connected to said mechanism by the pipe 39, and actuated by the attendant as he deposits a gather of glass into the waiting mold. The bleeder valve Q corresponds to the bleeder valve 79 in my said Letters Patent.

A number of automatic feeders are now in general use, and it is evident to those skilled in the art that an automatic actuation of the table locking mechanism to release the same at the proper moment may be substituted.

It is also evident to those skilled in the art that the tapping apparatus may be connected up and controlled in various other ways to produce proper synchronization of its operation without departing from the scope of my present invention.

It is further evident that other mechanism than that illustratively shown in the drawings may be employed to move the mold from its glass receiving and fabricating position past the vertical so that its momentum and gravity will cause it to fall down into its inverted position, striking the mold support a blow as the latter halts its fall, thus jarring the mold and ejecting the article by an impact exerted directly in the line and direction of the path of discharge.

It is evident from the foregoing that after the fabrication of the articles or ware in the molds, said molds are in turn reversed, jarred or tapped to discharge the ware, and are then turned back into their upright position before they reach the feeding station.

Although, for the sake of clearness in disclosure, I have described in detail the embodiment of the principles of my invention illustrated in the drawings, I do not wish to limit myself thereby, but claim broadly—

1. In a machine for fabricating articles of glass, the combination of a movable mold support provided with an aperture for the downward discharge therethrough of the fabricated article, a mold hingedly mounted on said support in such a manner that it may be inverted into registration with said aperture for discharging the article, means for inverting said mold after each fabricating operation, and means for returning the mold to its upright position before the next fabricating operation.

2. In a machine for fabricating articles of glass, the combination of a movable mold support provided with an aperture for the downward discharge therethrough of the fabricated article, a mold hingedly mounted on said support in such a manner that it may be inverted into registration with said aperture for discharging the article, and means positioned along the path of said support for inverting the mold to discharge the fabricated article therefrom and for returning the mold to its upright position before the next fabricating operation.

3. In a machine for fabricating articles of glass, the combination of a movable mold support provided with an aperture for the downward discharge therethrough of the fabricated articles, a mold hingedly mounted on said support in such a manner that it may be inverted into registration with said aperture for discharging the article, and fixed means adjacent to said mold support and adapted to be engaged by the traveling mold to first invert the latter to discharge the article through the aperture and then to return the same to its upright position before the next fabricating operation.

4. In a machine for fabricating articles of glass, the combination of a mold table rotatable on a vertical axis and provided with an annular series of apertures concentrically arranged, an equal number of molds hingedly mounted on said table to swing on horizontal axes outside of their perimeters, one of said molds being positioned at one side of each of said apertures, and means adapted to be engaged by the molds as they travel with said table whereby the molds are in turn inverted for the discharge of the fabricated articles through said aperture and then returned to their upright positions before the next fabricating operation.

5. In a machine for fabricating articles of glass, the combination of a mold table rotatable on a vertical axis and provided with an annular series of apertures concentrically arranged, an equal number of molds hingedly mounted on said table to swing on horizontal axes outside of their perimeters, one of said molds being positioned at one side of each aperture, and means mounted adjacent to the table and engaged in turn by said molds whereby the latter are inverted after a fabricating operation to discharge the fabricated articles through the corresponding apertures and then turned back into their upright positions before another fabricating operation.

6. In a machine for fabricating articles of glass, the combination of a mold table rotatable on a vertical axis and provided with a plurality of pairs of apertures arranged concentrically of said table, an equal number of molds hingedly mounted on said table in such manner that when a mold is in its upright position it is in registration with one aperture of the corresponding pair and when said mold is inverted it is in registration with the other aperture of said pair for the discharge of the fabricated article from said mold through said last named aperture, and means positioned adjacent to the table and engaged by the mold as it travels with the table whereby after a fabricating operation the mold is inverted to discharge the fabricated article and then turned back into its upright position before the next fabricating operation.

7. In a machine for fabricating articles of glass, the combination of a mold table rotatable on a vertical axis and provided with a plurality of pairs of apertures arranged concentrically of said table, a plurality of mold carriers hingedly mounted on said table so as to be swung into registration with either one of each pair of apertures, a mold removably mounted in each of said carriers, and means positioned adjacent to the table and engaged in turn by each of said carriers, whereby after a fabricating operation the mold is inverted over one of the apertures of the corresponding pair to discharge the fabricated article through said aperture and is then reversed into its upright position before its next fabricating operation.

8. In a machine for fabricating articles of glass, the combination of a mold table rotatable on a vertical axis and provided with a series of apertures arranged concentrically of the table, a mold carrier hingedly mounted on said table adjacent to each of said apertures, a mold removably mounted in each of said carriers, and means positioned adjacent to the table and engaged in turn by said carriers, whereby after a fabricating operation the mold is inverted into registration with the corresponding aperture for the discharge of the fabricated article therethrough and is then returned to its upright position before its next fabricating operation.

9. In a machine for fabricating articles of glass, the combination of a mold support, a mold hingedly mounted on said support in such a manner that it may be inverted to discharge the fabricated article, the support being apertured to permit the article to drop down out of the inverted mold, and mechanical means for turning the mold from its upright position to beyond its vertical position whereby the mold falls into its horizontal inverted position, being halted therein by contact with the mold support thereby imparting an article-dislodging jar as the mold assumes its inverted position.

10. In a machine for fabricating articles of glass, the combination of a mold support, a mold hingedly mounted on said support and adapted to be inverted to discharge the fabricated article, the mold being supported by the mold support in both its upright and inverted positions and the mold support being provided with an aperture to permit the downward discharge of the article from the inverted mold, and mechanical means for elevating the mold from its upright position to beyond the vertical whereby the mold falls down into its inverted position and the article is jarred loose from the mold by the impact of the falling mold on the mold support.

11. In a machine for fabricating articles of glass, the combination of a moving mold support, a mold hingedly mounted on the support and adapted to be inverted to discharge the fabricated article, the mold being supported in both its upright and inverted positions by the mold support and the mold support being apertured to permit the downward discharge of the ware from the inverted mold, and means whereby while the mold support is moving the mold is elevated from the upright position to beyond the vertical and the mold then falls into its inverted position, the impact of the mold against the mold support serving to jar the article loose from the mold.

12. In a machine for fabricating articles of glass, the combination of an intermittently moving mold support, a mold hingedly mounted on said support and adapted to be inverted to discharge the fabricated article, the mold being supported in both its upright and inverted positions by the mold support and the mold support being apertured to permit the downward discharge of the ware from the inverted mold, and means operative while the mold support is moving for elevating the mold from its upright position to beyond the vertical, whereby as the mold support comes to rest the mold drops into its inverted position, the impact of the mold on the mold support serving to jar the article loose from the mold.

13. In a machine for fabricating articles of glass, the combination of a movable mold support provided with an aperture for the downward discharge therethrough of the fabricated article, a mold hingedly mounted on said support in such a manner that it may be inverted into registration with said aperture for the discharge of the article, means positioned along the path of said support for inverting the mold to discharge the fabricated article therefrom and for returning the mold to its upright position before the next fabricating operation, and reciprocal means engaging the inverted mold from below through said aperture to jar the same for the purpose described.

14. In a machine for fabricating articles of glass, the combination of a mold table rotatable on a vertical axis and provided with a plurality of apertures arranged concentrically of said table, an equal number of molds hingedly mounted on said table in such manner that they may be inverted into registration with the corresponding aperture for discharging the fabricated article, means for inverting the molds in turn to discharge the articles fabricated therein through the corresponding apertures, and means mounted below said table and engaging said inverted molds in turn as they are brought into registration therewith by the rotation of said table for the purpose described.

15. In a machine for fabricating articles of glass, the combination of a mold table rotatable on a vertical axis and provided with a plurality of apertures arranged concentrically of said table, an equal number of molds hingedly mounted on said table in such manner that they may be inverted into registration with the corresponding aperture for discharging the fabricated article, means for inverting the molds in turn to discharge the articles fabricated therein through the corresponding apertures, and a reciprocating jarring tool mounted below said table at the discharging position and adapted to engage the inverted molds from below.

Signed at Pittsburgh, Pa., this 30th day of August, 1923.

WILLIAM J. MILLER.